Figure 4:
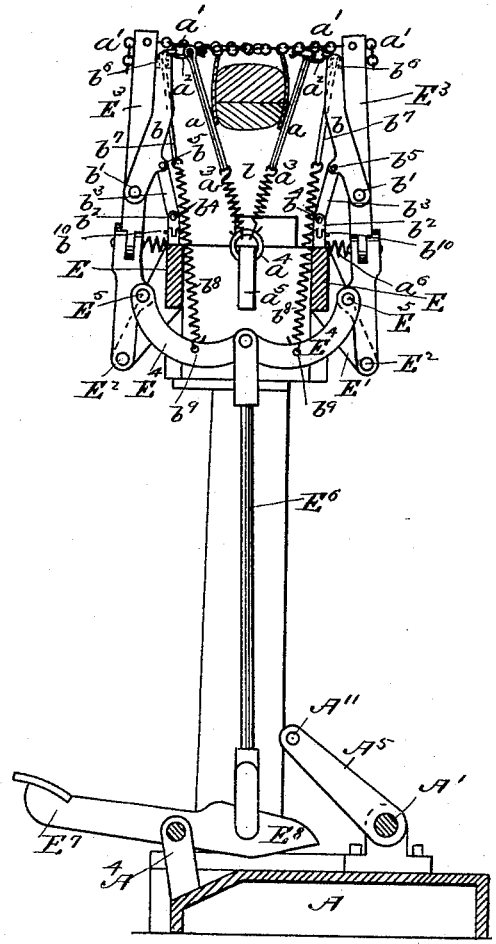

(No Model.) 9 Sheets—Sheet 1.
G. W. COPELAND, J. E. CRISP & E. F. GRANDY.
LASTING MACHINE.
No. 465,073. Patented Dec. 15, 1891.
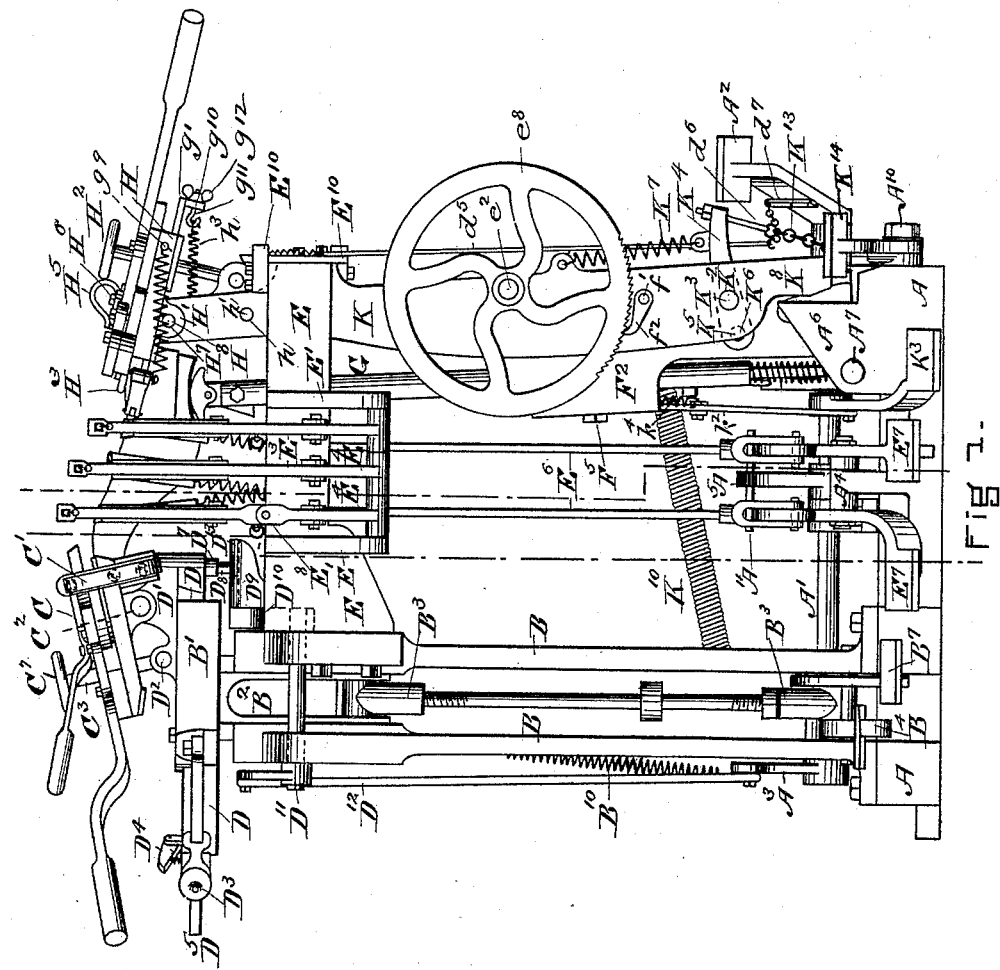
WITNESSES.
Frank G. Parker
Edward S. Day.
INVENTORS
George W. Copeland,
Joseph E. Crisp,
Edward F. Grandy,
by Geo. W. Copeland.
Attorney.

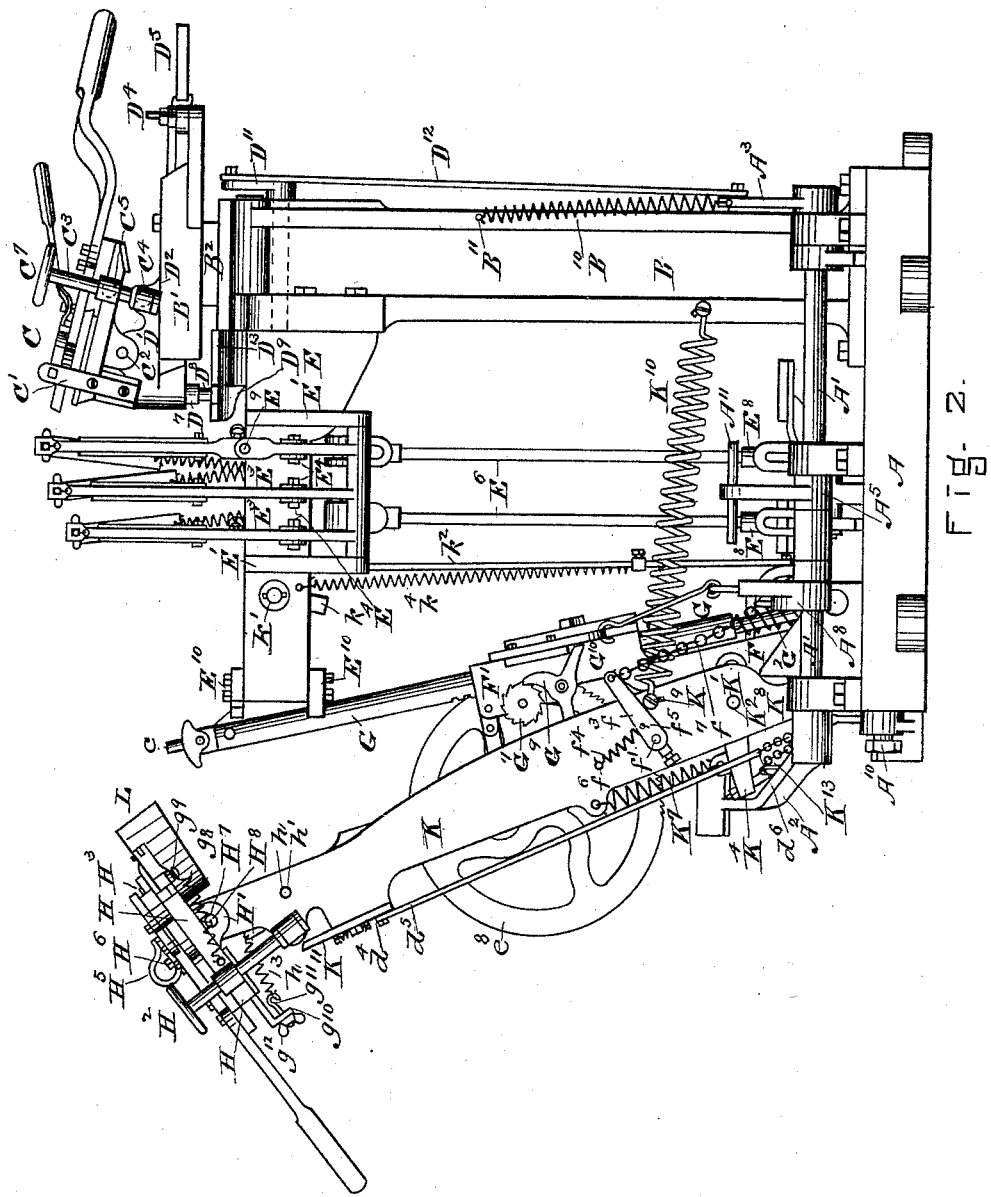

(No Model.) 9 Sheets—Sheet 3.
G. W. COPELAND, J. E. CRISP & E. F. GRANDY.
LASTING MACHINE.

No. 465,073. Patented Dec. 15, 1891.

WITNESSES.
Frank G. Parker
Edward S. Day

INVENTORS
Geo. W. Copeland
Joseph E. Crisp
Edward F. Grandy
by Geo. W. Copeland,
Attorney (No Model.) 9 Sheets—Sheet 4.

G. W. COPELAND, J. E. CRISP & E. F. GRANDY.
LASTING MACHINE.

No. 465,073. Patented Dec. 15, 1891.

WITNESSES.
Frank H. Parker
Edward S. Day

INVENTORS
George W. Copeland
Joseph E. Crisp
Edward F. Grandy
by Geo. W. Copeland,
Attorney

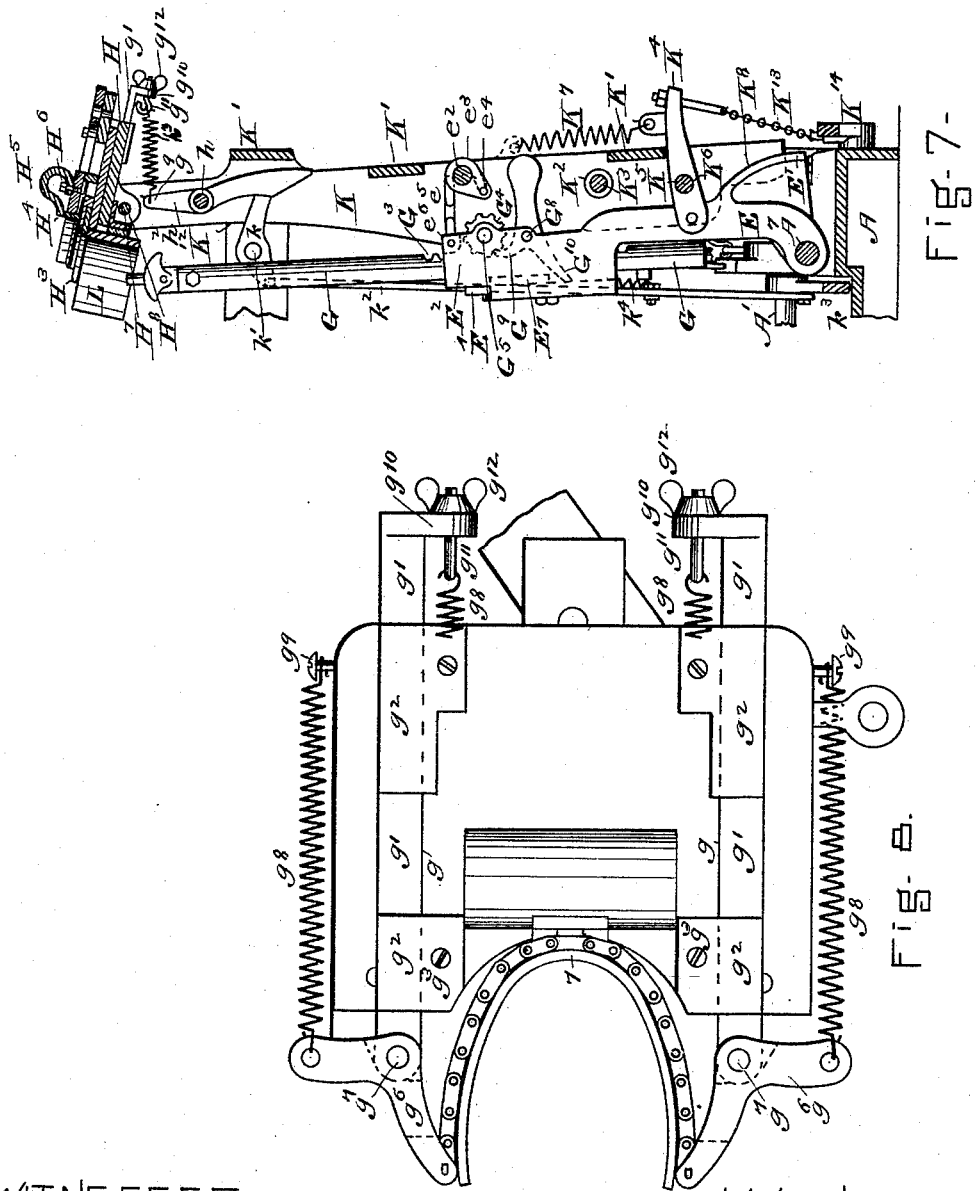

(No Model.) 9 Sheets—Sheet 6.
G. W. COPELAND, J. E. CRISP & E. F. GRANDY.
LASTING MACHINE.
No. 465,073. Patented Dec. 15, 1891.
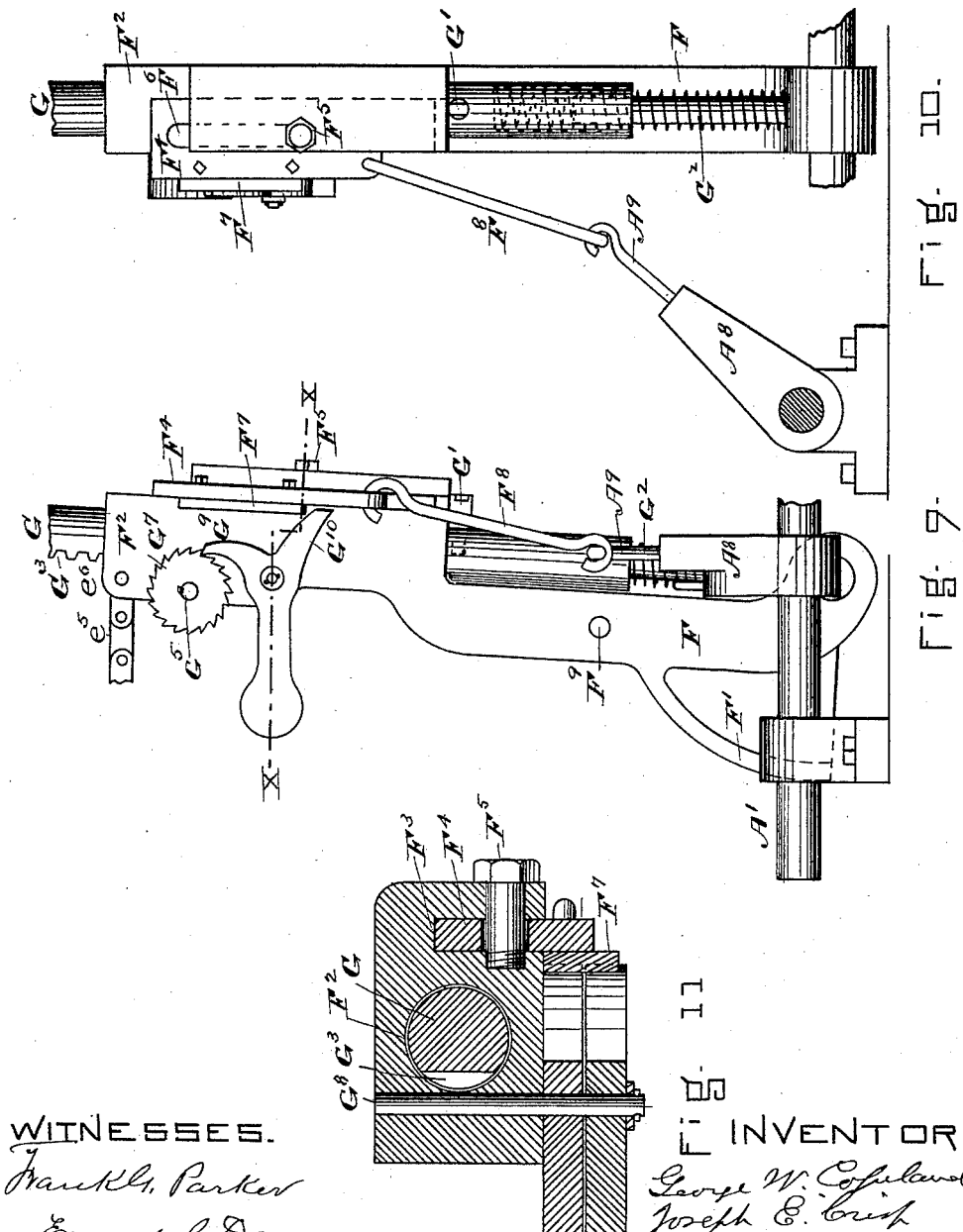

(No Model.) 9 Sheets—Sheet 7.

G. W. COPELAND, J. E. CRISP & E. F. GRANDY.
LASTING MACHINE.

No. 465,073. Patented Dec. 15, 1891.

WITNESSES
Frank G. Parker
Edward S. Day

INVENTORS
George W. Copeland
Joseph E. Crisp
Edward F. Grandy
by
Geo. W. Copeland, Atty (No Model.) 9 Sheets—Sheet 8.
G. W. COPELAND, J. E. CRISP & E. F. GRANDY.
LASTING MACHINE.

No. 465,073. Patented Dec. 15, 1891.

WITNESSES.
Frank H. Parker
Edward S. Day

INVENTORS
George W. Copeland
Joseph E. Crisp
Edward F. Grandy,
by Geo. W. Copeland,
Attorney.

(No Model.) 9 Sheets—Sheet 9.

G. W. COPELAND, J. E. CRISP & E. F. GRANDY.
LASTING MACHINE.

No. 465,073. Patented Dec. 15, 1891.

UNITED STATES PATENT OFFICE.

GEORGE W. COPELAND, OF MALDEN, AND JOSEPH E. CRISP AND EDWARD F. GRANDY, OF SOMERVILLE, MASSACHUSETTS, ASSIGNORS, BY MESNE ASSIGNMENTS, TO THE COPELAND RAPID LASTER MANUFACTURING COMPANY, OF PORTLAND, MAINE.

LASTING-MACHINE.

SPECIFICATION forming part of Letters Patent No. 465,073, dated December 15, 1891.

Application filed June 5, 1891. Serial No. 395,175. (No model.)

*To all whom it may concern:*

Be it known that we, GEORGE W. COPELAND, of Malden, and JOSEPH E. CRISP and EDWARD F. GRANDY, of Somerville, all in the county of Middlesex and Commonwealth of Massachusetts, have invented certain new and useful Improvements in Lasting-Machines, of which the following specification and accompanying drawings are such a full, clear, and exact description as will enable others skilled in the art to make and use the same.

This invention relates to improvements upon the various patents granted to George W. Copeland, Joseph E. Crisp, and Edward F. Grandy, collectively or individually, since October 27, 1885, for lasting-machines or parts thereof.

It consists in bringing the essential features of the aforesaid inventions together in compact and single mechanism, comprising therein improved devices for operating the holding or retaining straps, the heel and toe lasting heads, the toe-rest, and the jacking devices, increasing their efficiency and reducing their cost.

Figure 3:
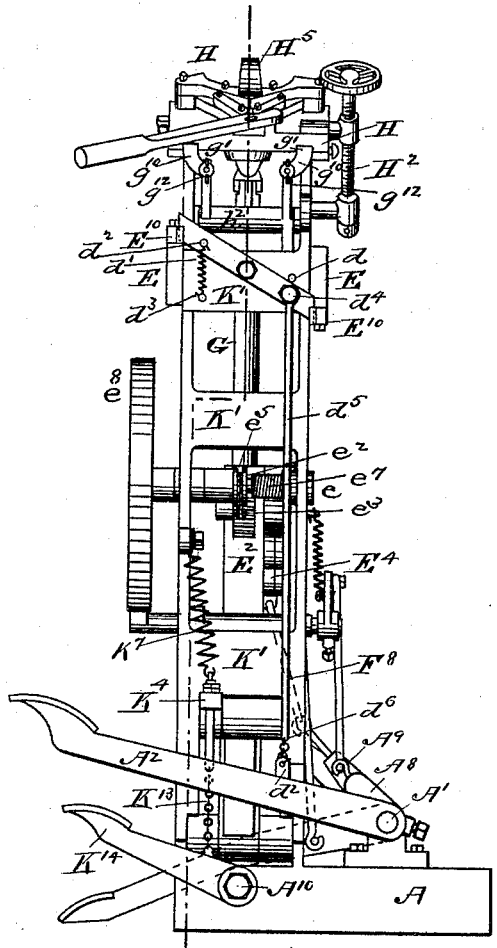
Figure 5:
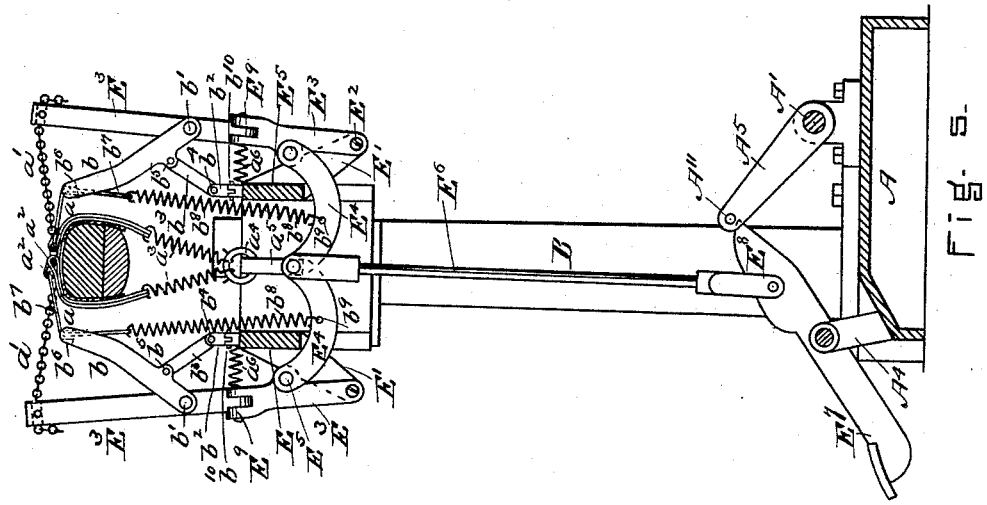
Figure 6:
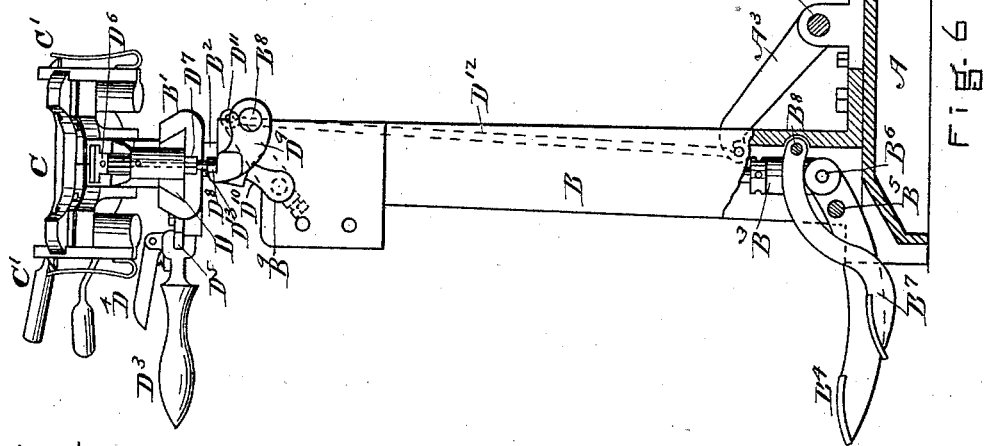
Figure 12:
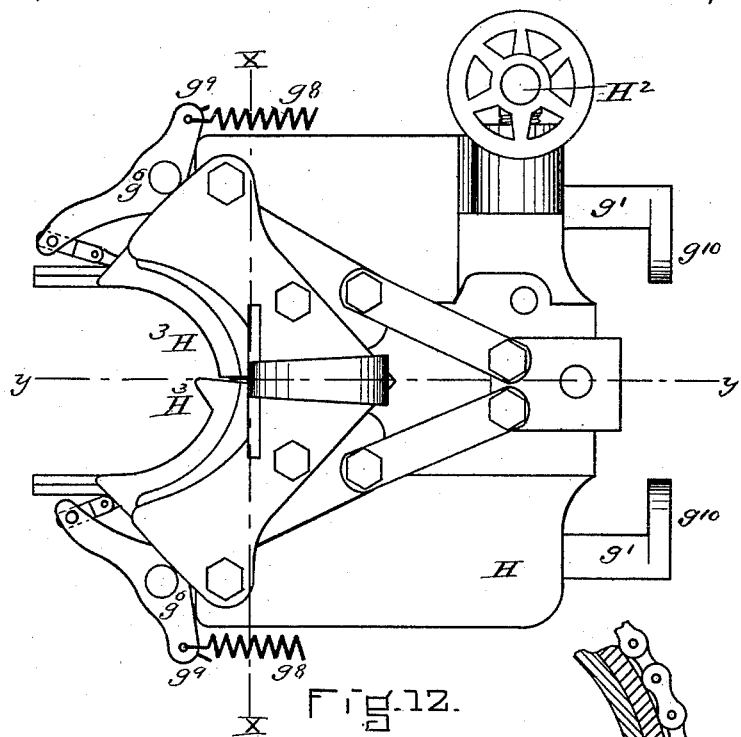
Figure 16:
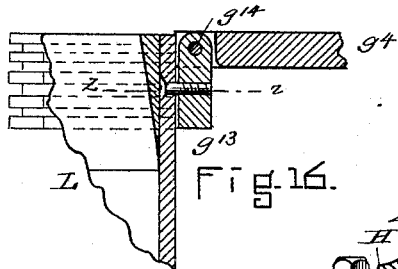
Figure 17:
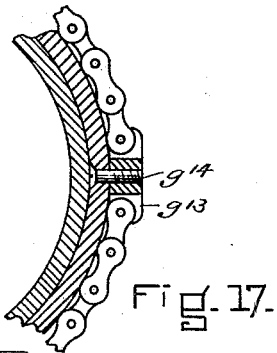
Figure 15:
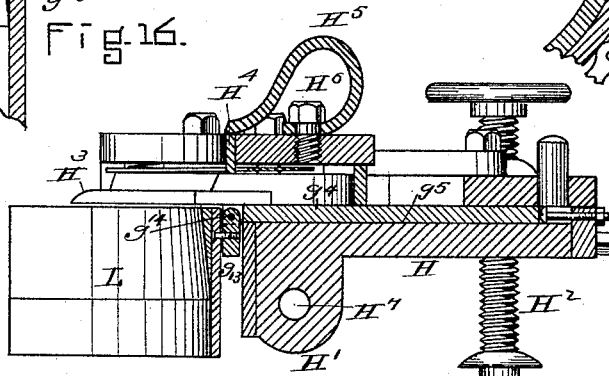
Figure 13:
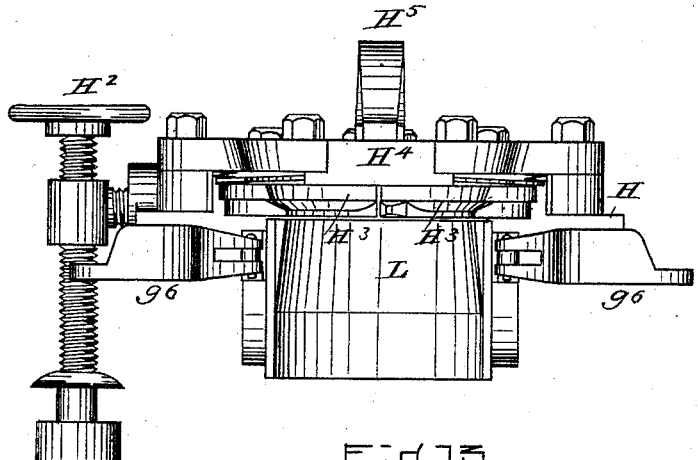
Figure 14:
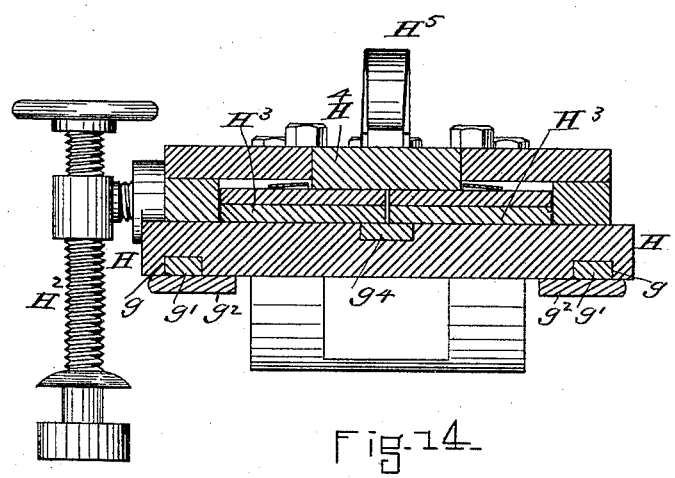
Figure 18:
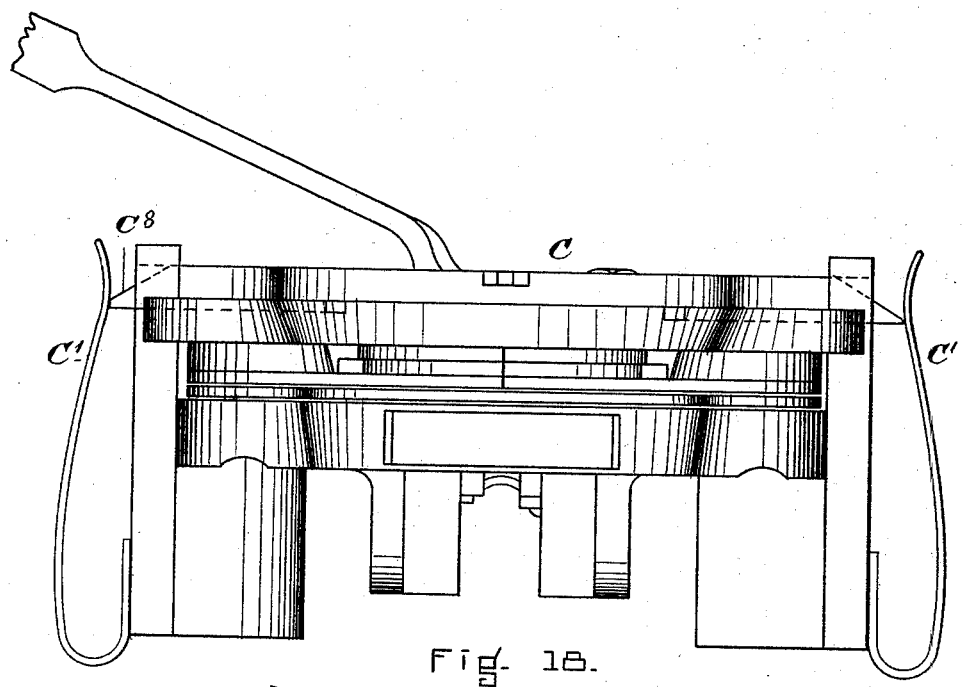

In the drawings, Figure 1 is a front elevation of the machine closed, and showing a last held in operative position therein. Fig. 2 is a rear elevation of the machine unlocked and open for the reception of a last. Fig. 3 is an end elevation showing the mechanism for locking and unlocking the machine. Fig. 4 is a sectional view showing the strap-operating mechanism with the straps held open for the reception of the last. Fig. 5 is the same view as Fig. 4, showing the straps drawn around a last and holding the upper thereto. Fig. 6 is an elevation of the toe-lasting mechanism with the supporting-post and base of the machine partially in section. Fig. 7 is a central vertical section of the mechanism for locking and unlocking the machine, showing the means of closing the heel-band and drawing down the heel-lasting head. Fig. 8 shows the under side of the heel-lasting head and the means for operating the heel-band. Fig. 9 is a rear elevation of the swinging arm carrying and guiding the jack-post, showing the devices used to automatically lock the jack-post at any desired height. Fig. 10 is an elevation of Fig. 9, looking from the toe-lasting mechanism. Fig. 11 is a horizontal cross-section of Fig. 9 on line X X. Fig. 12 is a plan of the heel-lasting head. Fig. 13 is a front elevation of the heel-lasting head. Fig. 14 is a vertical cross-section of the heel-lasting head on line X X, Fig. 12. Fig. 15 is a longitudinal vertical section of the heel-lasting head on line $y\,y$, Fig. 12. Fig. 16 is a longitudinal vertical section on line $y\,y$, showing the manner of connecting the heel-lasting band to the heel-lasting head. Fig. 17 is a horizontal cross-section on line $z\,z$, Fig. 16. Fig. 18 shows the springs $C'$ attached to the toe-lasting head, and Fig. 19 a vertical cross-section of Fig. 18.

The base A is of sufficient strength and size to support and carry the various parts of the machine hereinafter described. On the rear of this base are formed or attached bearings which carry the return or releasing shaft $A'$. To one end of this shaft is fixed the foot-treadle $A^2$, Figs. 1, 2, and 3, and to the other end is fixed the lever $A^3$, to which is secured one end of the spiral spring $B^{10}$, whose other end is attached to the post B at $B^{11}$, the action of this spring $B^{10}$ holding the foot-treadle $A^2$ in the normal position, from which it is depressed for the purpose of operating the various levers attached to the shaft $A'$ when lasts are placed in or removed from the machine. To one end of the base is firmly fixed the post B, carrying the toe-lasting mechanism.

Figure 19:
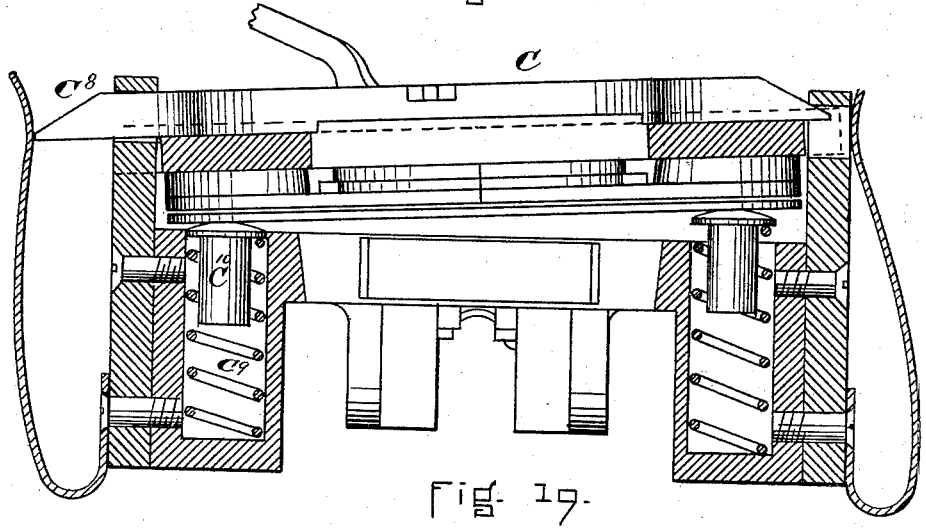

The toe-lasting head C is the subject-matter of Patent No. 439,051, of October 21, 1890, combined with an improvement whereby the tension of the springs in the pockets below the lasting-plates can be reduced, and the reciprocation of the double-ended wedge will require less exertion. At the same time said wedge will maintain its set position, as before. This device is illustrated by Figs. 18 and 19, and it consists of the curved springs $C'$, attached to the sides of the apertured lugs, so that one of these springs will engage with the end of the double-ended wedge, which protrudes from the lug to which the spring is attached as soon as the opposite inclined end of said wedge is active and begins to change the inclination of the lasting-head. These springs C' are made strong enough to resist the tendency of the operating-wedge to slide from under the lug, due to the inclination of the wedge, which is made possible by the decrease of the strength of the springs in the pockets below the lasting-plates, and they assist materially in the transverse angular adjustment of the lasting-plates, as described in the patent for this lasting-head.

The toe-lasting head C is mounted upon the top part of the post B, so that its lasting-plates can be caused to act upon the upper around the toe of the inverted last held in the machine at any desired distance below the line of the inner sole and then move upward, thereby forming the upper around the toe of the last up to the line of the inner sole, where the operation of the lasting-plates will turn and press the edges or margin of the upper close down upon the inner sole, ready to be fastened thereto.

The toe-lasting head C is given the requisite motions for operative purposes in the following manner: It is pivoted to a projection D', provided for that purpose on the horizontal slide D, by the pivot-pin $C^2$, Figs. 1, 2, and 6, and is provided with the adjusting-screw $C^3$ to give it longitudinal angular adjustment, so as to cause the lasting-plates to conform to the spring of the last. The lower end of the screw $C^3$ is fitted to a hub $C^4$, so that it can turn therein, and is provided with fixed collars which contact with the faces of the hub $C^4$ and hold the screw fixed endwise. Another hub $C^5$ is provided with a screw-thread, and the screw $C^3$ is fitted to turn therein. These hubs have bolt-like projections provided with screw-threads which are fitted to corresponding screw-threads formed in the proper positions upon the slide D at $D^2$ and the toe-lasting head at $C^6$. The heels $C^4$ and $C^5$ turn upon their screws as the screw $C^3$ is operated by the hand-wheel $C^7$ to change the angular relations of the slide D and toe-lasting head C, thus forming a rigid but easily-operated adjustable connection between those two parts.

The means for giving the toe-lasting plates transverse angular adjustment are fully described in the patent for the said toe-lasting head.

The horizontal slide D, carrying the toe-lasting head, is given the necessary movement to enable the toe-lasting plates to operate upon any length of last within the scope of the machine by the handle $D^3$, which handle is held at any desired place by its spring-catch $D^4$ engaging with the segmental ratchet $D^5$. The horizontal slide D is fitted to the guideway B', and attached to and forming part of this guideway is the vertical slide $B^2$, fitted to and sliding in a guideway formed for its reception in the top of the post B, Fig. 1, and reciprocation of the slide $B^2$ gives the desired vertical movements to the toe-lasting head and its operating mechanism, which is carried thereon. Pivoted to the lower end of the slide $B^2$ is the adjustable connecting-rod $B^3$, and the other end of this rod is pivoted to the inner end of the foot-treadle $B^4$, which is in turn fulcrumed to the post B at $B^5$, Fig. 6, so that the depression of the foot-plate of the treadle $B^4$ will raise the toe-lasting head as desired. The pivot-pin at the lower end of the connecting-rod $B^3$ is extended beyond the bearing and has mounted on this extension the roll $B^6$. The foot-treadle $B^7$ is fulcrumed to the post B at $B^8$, Figs. 1 and 6, so that it will be over the roll $B^6$, as shown, and will be raised by said roll in unison with the toe-lasting head. The lower end of the connecting-rod $B^3$ and the parts of the treadles $B^4$ and $B^7$ are fitted together, so that they will fill the space formed for their reception at the lower end of the post B, for the purpose of causing the whole combination to operate smoothly. The weight of the parts carried by the slide $B^2$ always returns the lasting-head after use to its lowest position of rest, ready to be again elevated as desired by the foot-treadle $B^4$, and the location of the fulcrum of the foot-treadle $B^7$ with reference to the roll $B^6$ enables the operator to exert a powerful downward pressure upon the lasting-plates after they have been moved over the inner sole and perfectly iron down the upper thereon. The toe-rest $D^6$, which holds the toe of the last at the correct height for the action of the toe-lasting plates, is mounted upon the guiding-stem $D^7$, which is fitted to slide vertically in a guide formed on or attached to the horizontal slide D, Figs. 1, 2, and 6, so that it will move in unison therewith and preserve the relations between the toe-rest and lasting-plates as said plates are adjusted to lasts of varying lengths. This toe-rest is provided with the adjusting-screw $D^8$, which maintains the inner sole at the correct height as the thickness of the toe of the lasts varies in different styles. The support $D^9$ under the adjusting-screw is inclined properly to cause the toe-rest to automatically adjust itself to the variations of thickness of the toe in different lengths of lasts of the same style as it is moved to receive them. In order to facilitate the entry of lasts into the machine, the toe-rest is caused automatically to reciprocate to and from its operative position to another lower position. This is accomplished by swinging the support $D^9$ in a bearing formed on or attached to the post B at $B^8$, so that it will swing freely therein and swing the block or brace $D^{10}$ in other bearings formed on or attached to the other side of the post at $B^9$, Figs. 1, 2, and 6. The pivot-pin forming part of the block $D^{10}$ is extended beyond the side of the post B, and has fitted to its end the lever $D^{11}$, and a connecting-rod $D^{12}$ connects this lever's outer end with the outer end of the lever $A^3$, which is fixed on the releasing-shaft $A'$. These levers $D^{11}$ and $A^3$ are so proportioned to each other that when the releasing-shaft $A'$ is operated by its foot-treadle $A^2$ the block $D^{10}$ is swung from under and lets the supports for the rest swing down by gravitation to the desired point. The toe-rest follows its support as it moves down, and is returned to fixed operative position upon the release of the treadle $A^2$.

The support for the toe-rest and the block $D^{10}$ are made strong enough to sustain the severe strain brought upon the toe-rest by the operation of the treadle $B^7$ when the parts are in operation position, as shown by Fig. 6, and the upper part of the support is provided with a raised rib $D^{13}$, Fig. 6, which presses against one side of the head of the height-adjusting screw of the toe-rest $D^8$ and keeps it from turning or changing its set position.

Fixed to the post B are the horizontal parallel ties E, formed in one piece, to which is locked the heel-lasting mechanism when the machine is in operative position, as shown by Fig. 1. These ties have the projections $E'$ branching from them, Figs. 1, 2, 4, and 5, and fixed in the ends of the branches are the pivot-pins $E^2$. These pivot-pins carry the swinging arms $E^3$, operating the side-lasting mechanism, which consists of any desired number of pairs of holding-straps held sufficiently apart to allow the last to pass freely through them to the toe-rest, as shown by Fig. 4, and which are drawn around the upper from opposite sides thereof during the lasting process, as shown by Fig. 5, where they hold the upper firmly to the sides of the last and down upon the inner sole.

In the machine described two pairs of holding-straps are used and operated in unison over the shank of the last and one pair to operate over the ball of the last. As the description of a single pair of straps will serve for that of all, those operating over the ball of the last and illustrated by Figs. 1, 2, 4, and 5 will be used.

The swinging arms $E^3$ are levers of the third order, and are fulcrumed upon the pivot-pins $E^2$. They swing from each other in the act of drawing the holding-straps $a$ around the last by the action of the toggle $E^4$, pivoted to them at $E^5$. This toggle is operated by moving its center up with the connecting-rod $E^6$, operated in turn by the foot-treadle $E^7$, fulcrumed to a stand $A^4$ on the base A, all of these parts being connected in the usual manner. The connecting-rod $E^6$ is so adjusted for length that when the treadle $E^7$ is fully depressed the center of the toggle $E^4$ is raised just enough above the centers of the pivot-pins at $E^5$ to prevent the swinging arms $E^3$ from being drawn together by the springs attached to the holding-straps $a$. This adjustment of parts causes the toggle $E^4$ to serve as a lock to hold the swinging arms $E^3$ apart without relaxing in the slightest the strain upon the holding-straps, which is a feature of great importance in strap lasting-machines.

The swinging arms $E^3$ are of the proper length for that part of the last in connection with which they are designed to operate, and to their upper ends there is secured a suitable connection $a'$ for drawing the holding-straps $a$. These connections are of such length that they will just pass the median line of the last when the straps are fully drawn, and they may be made of chain, leather, wire, or any other suitable material. The holding-straps $a$ are made of a doubled strap of suitable leather, and the loop of the strap is passed through a connection $a^2$, attached to one end of the connection $a'$, and the ends of the doubled straps are hooked to one end of the suitable spiral springs $a^3$, with the opposite ends of the springs hooked upon a ring $a^4$, which ring in turn passes through the projection $a^5$, formed for its reception upon or attached to the ties E at the proper location. The loop of the strap $a$, as the strap is drawn over the last, slides through the connection $a^2$, and allows the outer part of the strap to draw upon and assist the inner part in holding the upper, which would not be the case were the doubled strap fixed at both ends.

The holding-straps and their connections are made of such length and are so positioned with reference to the lasts used that the straps commence to draw the upper around the last and over the inner sole from the time the straps strike the sides of the lasts until the looped ends thereof have been drawn just past the median line, where, by the aforedescribed action of the strap-drawing arms $E^3$, they are held without relaxing their strain until the last is released from their embrace.

The inner end of the foot-treadle $E^7$ is extended beyond the point where the connecting-rod is pivoted to it, and when it is desired to release the last from the holding-straps in the usual opening of the whole machine the end of this extension $E^8$ is pushed down by contacting with the pin $A^{11}$ of the lever $A^5$, which lever is fixed upon the releasing-shaft $A'$ and operated by the common releasing-treadle $A^2$. When the downward movement of the extension $E^8$ has drawn the joint of the toggle below the line of its pivoted ends, the spiral springs $a^6$, attached to the ties E and the swinging arms $E^3$, draw said arms, the toggle, and the foot-treadle from the position shown by Fig. 5 to that shown by Fig. 4, and there hold them until the treadle $E^7$ is again depressed.

Sometimes it is found desirable to release one set or pair of holding-straps without unlocking the whole machine. With the described mechanism for drawing the straps this is easily done by the operator, who raises the proper treadle a little, with his toes placed under the foot-piece thereof, when the springs $a^6$ will act, as has been described.

To hold the lasting-straps spread open so that the last with the unlasted upper thereon may pass freely between them and under their operating connections, there is pivoted to the strap-drawing arms $E^3$ at $b'$ the swinging arms $b$, Figs. 4 and 5, which are formed of two thin parts joined together at the top, and which straddle the arms $E^3$, as shown by Figs. 1 and 2. To operate the arms $b$ studs $b^2$ are screwed into the top edges of the ties E, and link connections $b^3$ are pivoted to the top of the studs $b^2$ at $b^4$ and to the arms $b$ at $b^5$. This connection $b^3$ causes the arms $b$ to swing in toward the last as the strap-drawing arms $E^3$ are swung out, and, turning the studs $b^2$ in and out of the ties E, adjusts the range of the swing of the arms $b$. The upper joining part of the arms $b$ is formed with a narrow slot $b^6$ therein so finished that a narrow strap $b^7$ will slide freely therein, and one end of the strap $b^7$ is secured to the connection $a^2$ and the other end is passed through the slot $b^6$ and connected by a spiral spring $b^8$ to the toggle-arms at $b^9$. The advantages of this combination of mechanism over any used for drawing the holding-straps of a strap lasting-machine are that the holding-straps are held well apart and their operating connections well up, so as to clear the sides of the last and the projecting edges of the unlasted upper thereon as the last is passed into lasting position. As the strap-drawing arms $E^3$ are operated from the position shown by Fig. 4 to that of Fig. 5, the spiral springs $b^8$ are moved upward and ease the strain upon the spreading-straps $b^7$ while they render through the slots $b^6$, and at the same time the slots themselves are dropped down and allow the holding-straps $a$ to draw correctly over the inner sole, and, furthermore, offer but little obstacle to the fastening of the upper to the inner sole, with the spreading-straps lying directly over the holding-straps.

As the toe-lasting head adjusts for varying length of lasts, it is desirable that the pair of holding-straps operating over the ball of the last should preserve their relative distance from the lasting-plates to give the best results, and this distance also varies in lasts having different curves at the ball of the foot. This adjustment is provided for by pivoting the strap-drawing arms $E^3$ at $E^9$ and pivoting the studs $b^2$ at $b^{10}$, so that all of the various parts above said pivots can be swung by the operator, and the holding-straps can also be drawn at any desired place between the toe-lasting head and the next pair of strap-drawing arms. The other pairs of strap-drawing arms may be pivoted likewise should it be desired to increase the range of the machine to last very small sizes.

The heel-lasting mechanism, in combination with the jack-post, is swung to and from operative position for the purpose of introducing and removing the lasts from the tunnel formed by the side-lasting straps and their operating-arms, and the jack-post is lowered to facilitate the introduction by the return-treadle $A^2$ in the following manner: Forming part of or attached to the base A are two strong lugs $A^6$, Figs. 1, 2, and 3, to which is fitted the pivot-pin $A^7$, and mounted upon this pivot-pin so that it will swing between the lugs is the swinging arm F. (Best shown by Figs. 7, 9, and 10.) The swinging arm F is provided with the projection $F'$, which contacts with the top of the base A and limits the backward motion of the swinging arm F when the machine is open, and at the upper end of this swinging arm is formed the round bearing or sleeve $F^2$, in which slides the jack-post G, which is fitted to slide freely, and is provided with the stop-pin $G'$. A spiral spring $G^2$, strong enough to raise the jack-post and the heaviest last that will be used as high as the stop-pin will allow when the machine is open, is arranged below the jack-post with a center guide fixed in the hub of the swinging arm F. There is a strong rack $G^3$ cut upon the jack-post, and intermeshing with the teeth of this rack are the teeth of the pinion-gear $G^4$, Fig. 7. This pinion is fixed to the shaft $G^5$, which is mounted in bearings $G^6$, formed on the swinging arm G at the correct distance from the rack $G^3$, so that tops and bottoms of the teeth of the rack and pinion, respectively, will contact and prevent the jack-post from turning in its bearing. On the end of the shaft $G^5$, at one side of the swinging arm G, is fixed the ratchet-wheel $G^7$, Figs. 9 and 10, and below the ratchet-wheel upon a strong pivot-pin $G^8$, fixed in the swinging arm G, are hung two counterweighted pawls $G^9$ of different lengths, one or the other of which engage with the teeth of the ratchet-wheel and hold the jack-post fixed against downward pressure. When the machine is open, the jack-post is held up by the spring $G^2$, with the stop-pin $G'$ against the under side of the bearing or sleeve $F^2$, and in the act of placing a last in the machine or removing it therefrom the jack-post is unlocked and drawn down by the return-treadle $A^2$, which operates the following mechanism for that purpose. In a guideway $F^3$, formed on the swinging arm F, there is fitted to slide freely the plate $F^4$, which plate is held in position by the bolt $F^5$, fixed in the swinging arm and passing through the slot $F^6$, formed through the plate $F^4$, this slot being long enough to allow the plate $F^4$ the desired range of motion. To the plate $F^4$ is bolted another smaller plate $F^7$, which is about the length of the slot $F^6$, and is so positioned with reference to the counterweighted pawls $G^9$ that as it is moved down its lower end will press upon the extensions or arms $G^{10}$ of said pawls and swing and hold the pawls clear of the teeth of the ratchet-wheel $G^7$ as the plate $F^7$ is moved farther down and until it has returned to its position of rest above the ends of the arms $G^{10}$. The plate $F^7$ is fixed upon the plate $F^4$ at such a distance from its lower end that as soon as the plate $F^7$ has raised the pawls $G^9$ clear of the ratchet-teeth the lower end of the plate $F^4$ rests upon the stop-pin $G'$, which is extended under the guideway, as shown by Fig. 9, and as the plate F⁴ continues its downward motion the jack-post G is carried down by the plate.

To operate the plate F⁴ there is placed upon the return-shaft A' the lever A⁸, provided with the extension A⁹, which extension is connected to the plate F⁴ by the link connection F⁸, as shown by Figs. 9 and 10, constructed with a ring at each end engaging with similar rings upon the plate F⁴ and the extension A⁹, which combination substantially forms a universal coupling and allows the jack-post to be operated at any angle within its range of motion, and at the same time the spring operating the return-shaft A' will raise the plates F⁴ and F⁷ and allow the pawls to engage with the teeth of the ratchet-wheel G⁷.

The heel-lasting head H is mounted upon the upper end of the swinging arm K, and is hung and provided with longitudinal angular adjustment by substantially the same mechanism used for that purpose with the toe-lasting head. The swinging frame K consists of two parallel plates held the correct distance apart by the stays K' to cause the edges of their lower ends to engage with the edges of the lugs A⁶. This swinging frame K is hung at K² upon the pivot-pin K³, so that it will straddle the lever K⁴, through which the pivot-pin K⁵ passes at K⁶, and upon which pin the frame K can be swung, Figs. 1, 2, 3, and 7. One end of the lever K⁴ is constructed to straddle the swinging arm F, and is pivoted thereto at F⁹ by the pivot-pin F¹⁰, so that as the lever H⁵ is operated the swinging frame K is reciprocated longitudinally with relation to the swinging arm F when these parts are in operative position, Fig. 7. The lever K⁴ is held up against one of the stays K' of the swinging frame K by the spiral spring K⁷, properly connected to its outer end and to the swinging frame K, this spring being made strong enough to support the weight of all the parts carried by the swinging frame K and to cause said frame and the lever K⁴ to act substantially as one piece and swing upon the pivot-pin F¹⁰ when the machine is opened and closed. To the outer end of the lever K⁴ is adjustably secured the chain connection K¹³, whose opposite end is connected to the foot-treadle K¹⁴, Figs. 1, 2, 3, and 7, and the depression of this treadle when the machine is locked together and the heel-lasting plates are drawn over the heel will draw said plates down with the requisite force to iron smooth the heel-seat. The treadle K¹⁴ is fulcrumed to the end of the base A upon the pin A¹⁰, and the chain connection allows the swinging frame K and the swinging arm F to be moved forward and back freely, as desired, which would not be the case were a rigid connection used.

The plates of the swinging frame K have extensions K⁸ below the pivot-pin, the ends of which contact with the top of the base A and limit the backward throw of the swinging arm when the machine is open, Fig. 2.

The edges of these extensions K⁸ are shaped so that by contact with the edges of the lugs A⁶ they will cause the swinging frame K to have a differential swinging movement with relation to the swinging motion of the swinging arm F when the machine is being opened and closed.

Attached to the swinging frame K at K⁹ is the long spiral spring K¹⁰, whose other end is secured to the post B at B⁹, which spring balances the weight of all the parts attached to the swinging arm F when the machine is open, so that when the operator places a last upon the jack-pin c and moves it toward the toe-lasting mechanism the heel-lasting head follows and finally catches the heel of the last at the point where the swinging frame K is locked to the horizontal ties E by the latch K¹¹ without exertion or care on the part of the operator. The latch K¹¹ is hung in the center upon the upper of the stays K⁷, and its ends swing into the beveled catches E¹⁰, fixed at the ends of the horizontal ties E, and hold the heel-lasting mechanism against all horizontal strains. This latch slides down in said catches when the heel-lasting plates are drawn down, as will be hereinafter described, for the purpose of ironing down the lasted upper over the heel-seat. A stop-pin d, fixed in the stay H², limits the swinging motion of the latch K¹¹, and the spiral spring d', connected to it at d² and to the stay at d³, swings it into the catches E¹⁰ whenever it is drawn by their beveled ends.

The sides of the swinging frame K are fitted to pass in between the ends of the horizontal ties E, and the inner edges of said frame are fitted to rest against stops K¹², formed for that purpose on the inner sides of the horizontal ties, so that the heel-lasting head is always held at the same point and against all lateral strains.

Attached to the latch K¹¹ at d⁴ is the rod d⁵, and the lower end of this rod is connected by a chain connection d⁶ to the return-treadle A² at d⁷, and whenever said treadle is depressed the latch K¹¹ is swung from contact with the catches E¹⁰ at the proper time for the heel-lasting mechanism to start back and open the machine.

In Patent No. 422,734 a brace K for the purpose of jacking the last for the action of the toe-lasting mechanism was shown and described, for which the following mechanism has been substituted with a substantial gain. Upon the swinging frame K at e there are formed bearings e' for the shaft e² to revolve in, and upon this shaft is fixed the small crank e³, Figs. 3 and 7, and to this crank at e⁴ is attached one end of the chain e⁵, with the other end of the chain hung in a slot e⁶, formed in the upper end of the swinging arm F. The whole length of crank and chain is such that when the machine is in the position shown by Fig. 2 the crank and chain are about straight with each other; but when the machine is in the position shown by Fig. 1, with the largest last ever used therein and the crank revolved to take the chain up, the chain will rest upon the shaft $e^2$, with the crank a little past the back center. As the size of the last decreases the crank is further revolved until the smallest size is reached, which is before the chain is wound once around the shaft $e^2$. Around the shaft is placed the torsional spring $e^7$, with one end fixed to the shaft and the other end secured to the inside of one side of the swinging frame H', which spring acts to keep the chain $e^5$ taut at all positions of the swinging frame. To the outer end of the shaft $e^2$ is fixed the hand-wheel $e^8$, Figs. 1 and 3, which is provided with ratchet-teeth on so much of its periphery as represents the requisite revolution of the shaft $e^2$ to draw the chain for all sizes of lasts after the machine is closed. Below the shaft $e^2$ on the swinging frame K are formed bearings $f$, to which is fitted the shaft $f'$, carrying at one end the pawl $f^2$, which engages with the ratchet-teeth of the hand-wheel $e^7$ and holds said wheel wherever the operator may leave it. To operate the pawl $f^2$ there is fixed to the opposite end of the shaft $f'$ the lever $f^3$, and the spiral spring $f^4$, connected to the lever $f^3$ at $f^5$ and to the side of the swinging frame at $f^6$, draws the pawl $f^2$ into contact with the periphery of the hand-wheel $e^7$. The outer end of the lever $f^3$ is attached by a chain connection $f^7$ to the lever $A^8$, and when the return-treadle $A^2$ is operated the pawl $f^2$ is drawn clear of the ratchet-teeth of the hand-wheel $e^7$ and allows this part of the machine to open. The advantages of this combination are that they cause the jacking mechanism to follow up the motions of the machine and also to be automatically released, and only require the operator to move the hand-wheel $e^8$ a few teeth in order to firmly jack the last.

The base-plate of the heel-lasting head H is pivoted by a projecting lug H' between the upper ends of the two plates, forming the swinging frame K at $H^7$ upon the pivot-pin $H^8$, and the screw $H^2$, connected to one side of the swinging frame K and to the base-plate H, gives longitudinal angular adjustment to the lasting-plates carried thereon by the same devices as those connected with the screw $C^2$ of the toe-lasting head, Figs. 1 and 2.

The heel-lasting band is composed of metal and leather, and is mounted on the base-plate H and operated by the following mechanism: On the under side of the base-plate H are formed guideways $g$ for the sliding bars $g'$, and the plate-caps $g^2$, secured to the base-plate of the screws $g^3$, hold these sliding bars in the guideways correctly, Figs. 7, 8, and 14. The center support $g^4$ of the heel-band is fitted to the groove $g^5$ on the upper side of the base-plate H, and the outer ends of the heel-band are properly hung on the inner ends of the bell-crank levers $g^6$, which levers are hung at $g^7$ on the inner ends of the sliding bars $g'$ by proper pivot-pins. To the outer ends of the bell-crank levers are connected the strong spiral springs $g^8$, which are connected to the base-plate at $g^9$, and when the machine is open they hold the ends of the heel-band spread to their full limit and draw the sliding bars $g'$ fully back. This is substantially the same mechanism for operating and holding heel and toe bands of lasting-machines described in Patent No. 329,367; but the mechanism operating the sliding bars $g'$ is an improvement upon any used for this purpose, and is constructed as follows: The outer ends of the sliding bars $g'$ are turned down and inward, as shown by Figs. 3, and through the ears $g^{10}$ so formed are placed the eyebolts $g^{11}$, having the length-adjusting thumb-nuts $g^{12}$. Mounted upon the pivot-pin $h$ between the two sides of the swinging frame K at $h'$ is the lever $h^2$, which above the fulcrum-pin $h$ consists of two arms upon a long hub set at such a distance apart as to stand opposite the two eyebolts $g^{11}$. To these eyebolts the arms of the lever $h^2$ are connected by the strong spiral springs $h^3$, which springs serve as elastic connecting-rods to draw the slide-bars $g'$ forward when the lever $h^2$ is actuated. The part of the lever $h^2$ below the fulcrum-pin consists of a single arm connected to the long hub in such position that when the swinging frame K is locked between the ends of the parallel ties E it will be in opposition to the end of the bell-crank lever $k$, which operates and locks the lever $h^2$. The bell-crank lever $k$ is pivoted in a bearing $k'$, formed near the outer end of the rear one of the parallel ties E, Figs. 2 and 7, and the end of said lever, operating in conjunction with the lower end of the lever $h^2$, is made of such length that when swung to the full limit of its motion with the parts of the machine locked together, as shown by Fig. 7, it (the lever $k$) always swings the lever $h^2$ to the full limit of its motion and there locks it, as shown by said figure. The opposite end of the bell-crank lever $k$ is attached to the connecting-rod $k^2$, and the connecting-rod is attached to the foot lever or treadle $k^3$, which is hung free on the return-shaft A', Figs. 1, 2, 3, and 7. To this connecting-rod $k^2$ is secured one end of the spiral spring $k^4$, whose opposite end is secured to the tie E. This spring $k^4$ is strong enough to raise the treadle $k^3$ and the parts attached thereto when the machine is open and bring and hold the operative end of the bell-crank lever $k$ in the position shown by Fig. 2, and the depression of the foot-treadle of the lever $k^3$ when the machine is closed brings together the heel-band and locks it around the counter of the upper just below the line of action of the heel-lasting plates. The advantages of this combination are its simplicity and the facts that while the lever $k$ locks the band around the heel against the tension of the spring connections $h^3$ the same spring connections act to lock the lever $k$ in position by the lower end of the lever $h^2$ pressing against it, while the spring connections $h^3$ equalize the strain of the band on right and left lasts, and may be set to any desired tension by the thumb-nuts $g^{12}$.

All of the above-described parts return automatically to their normal position, and finally the strain of the spring connections $h^3$ increases largely the facility of opening the machine to remove the lasted upper.

The metal part of the heel-lasting band consists of a flat-link chain built up to considerable width by a number of its links properly connected and attached to the center support $g^4$ and to the inner ends of the bell-crank levers $g^6$. This chain band is lined with leather properly secured to the chain, and to the top edge of the leather lining is cemented a wedge-like piece of leather for the purpose of causing the band to approximate the curve of the counter of the last and hold the upper firm to the last close under the line of the inner sole. Heretofore the center support $g^4$ of the heel-band has been made from one piece of metal terminating in a fixed ear, to which the metal chain was attached, and when the curve of the counter operated upon varied much from the original curve to which the leather lining of the heel-band was fitted the action of the band would be inefficient, and either the lining would have to be changed in form or the band replaced by one of proper shape. Fig. 16 and 17 show means for overcoming this difficulty and rendering the action of the heel-lasting band substantially automatic upon counters of varying curves. This is accomplished by making the ear $g^{13}$ of the center support $g^4$ for the heel-lasting band separate from the part fitting in the groove $g^5$ and pivoting it thereto at $g^{14}$, so that the ear $g^{13}$ can swing vertically lengthwise of the last operated upon and find its correct bearing at the heel end of the last, where there are the largest variations of curve. The outer ends of the chain band are also pivoted loosely to the inner ends of the bell-crank levers $g^6$, which give sufficient adjusting quality to the band on the sides of the counter where the variations of curve are but small.

The heel-lasting plates $H^3$ rest directly on the base-plate H, and are constructed and operated substantially as claimed in the seventh, eighth, ninth, and thirteenth claims of Patent No. 422,734, of March 4, 1890, and so much of the sixth claim thereof as relates to the spring $I^{12}$ and the spiral springs above it in the plate $I^{13}$; but it has been found desirable that the heel-lasting plates should rise slightly over the median line with reference to their outer edges and that at the same time they should maintain an approximate level with each other at that point, while they are drawn over and pressed down upon the heel-seat for the purpose of forming it, said heel being generally higher in the center than at the edges—that is, a little crowning. The desired result is secured by fitting the cross-bar $H^4$ so that it will slide in the front of the plate $I^{13}$, as shown by Figs. 12, 13, 14, and 15, and rest on the top of the heel-lasting plates near the inner edges in all the positions of said plates. The strong curved spring $H^5$ is secured to the plate $I^{13}$ by the bolt $H^6$, so that its outer end will rest upon the cross-bar $H^4$ and bear the heel-lasting plates down against stress applied from below by the act of drawing down the heel-lasting head. The cross-bar $H^4$ is made strong enough to be rigid, and should the leather of the counter turned over be thicker on one side than the other the cross-bar transmits the full strength of the spring $H^5$ to that side and holds the center of the plate it is acting upon parallel with its fellow, at the same time permitting both plates to rise a little at the median line and smooth the heel-seat equally at all parts.

The operation of this machine is easily understood, and commencing with the machine open, as shown by Fig. 2, is as follows: With an upper properly mounted upon a last the operator takes it preferably in his left hand near the heel and places it upon the jack-pin, at the same time with his right foot pressing down the return-treadle $A^2$, and swings the last toe foremost under the chains that are connected to the side-lasting straps. When the toe nearly reaches the toe-lasting plates which were left in position therefor after lasting the previous upper, the treadle $A^2$ is released, and as the last moves forward the toe-support moves up to operative position and the latch $K^{11}$ drops into place. At the same time the jack-post, actuated by the spring $G^2$, has raised the heel to the gage for height on one of the heel-lasting plates and has there been locked. The hand-wheel $e^8$ is then turned sufficient to firmly jack the last, as has been described in connection with the mechanism for that purpose. The operator then depresses the foot-treadle $k^3$ to the full limit and the heel-band is pressed firmly around the counter of the upper and there locked, as has been hereinbefore described. The next operation is to draw the leather of the upper well up by pinchers adapted to that purpose, and then the treadle operating the lasting-straps over the ball of the foot is fully depressed and said lasting-straps are locked fast at that place. Next in turn the leather toward and at the shank of the foot is properly drawn up and the treadle operating the straps for that part are depressed. Turning his attention to the heel, the operator grasps the handle actuating the heel-lasting plates, and with his foot on the treadle $K^{14}$, feeling the top of the inner sole with the lasting-plates, draws them over. He increases the pressure upon the treadle $K^{14}$ as the plates move forward, and at the end of their motion, or when he has moved them as far over as desired, he presses the lever $K^{14}$ firmly down and forms the heel-seat, and the frictional hold of the heel-lasting band retains the heel-lasting plates down. To last the toe, the operator ascertains if the toe-lasting plates are in correct lineal position, and they will be if the preceding upper was of the same length. If not, a slight motion of the swinging handle will make them so, and then with the fingers of the right hand or with a suitable device for that purpose the operator presses the upper away from the last over and against the toe-lasting plates, at the same time feeling the toe-lasting plates up to and against the upper, round the toe of the last, so that they fairly and pretty closely touch it, using the left hand upon the lever of the toe-lasting plates for that purpose, the transverse angular position of the lasting-plates having been previously set in anticipation of the angle of the toe of the last if it were different from that of the preceding one. The toe-lasting head is then raised by the foot of the operator pressing upon the treadle $B^4$, and this action, in connection with the movements already described, draws the leather up and tightly around the toe of the last. When the toe-lasting plates are high enough to pass over the inner sole, they are drawn over, and the action of the toe-lasting plates as their edges pass up and over the bend of toe forms it correctly and makes the toe smooth and perfect. If the operator thinks that the weight of the toe-lasting head and its attachments are not sufficient to properly iron down the upper, he passes his foot to the treadle $B^7$ and forces the lasting-plates down as much as desired. The upper is now ready to be fastened by tacks or pegs, or both, as the class of work requires. After fastening, the operator grasps the last as at starting and by pressing down the return or releasing treadle $A^2$ he returns to their starting positions, as has been described in detail, all operative parts that have been caused to act during the lasting process, and the machine is ready for another operation.

Having thus fully described the nature, construction, and operation of said improvements, we claim and desire to secure by Letters Patent of the United States—

1. In a lasting-machine of the character described, the springs $C'$ at each side of the head, in combination with the horizontal double-ended wedge $C^8$, substantially as described, and for the purpose set forth.

2. In combination with a lasting machine head and the support to which said head is pivoted for longitudinal angular adjustment, the screw $C^3$, provided with fixed collars, and the hubs $C^4$ and $C^5$, mounted upon screw-threads, all operating substantially as shown and described.

3. In combination with a lasting-machine head, the slides D and $B^2$, the connecting-rod $B^3$, the treadle $B^4$, the roll $B^6$, and the treadle $B^7$, all substantially as shown and described.

4. In combination with a lasting-machine head, the toe-rest $D^6$, the adjusting-screw $D^8$ therefor, the support $D^9$, provided with the rib $D^{13}$, the elevating and lowering block $D^{10}$, the lever $D^{11}$, the connection $D^{12}$, and the lever $A^3$, all constructed substantially as shown and described.

5. In combination with a lasting-machine, a toe-support provided with a height-adjusting screw, and a swinging support for said screw, constructed with the rib $D^{13}$, which engages with one side of said screw-head when said swinging support is in operative position, substantially as shown and described.

6. In a lasting-machine of the class described, whose lasting-straps or their operating connections are permanently positioned over the inner sole of the uppers to be lasted, swinging arms located on each side of the machine, with the lasting-straps secured to their upper ends, and toggle connections secured to their lower ends for drawing and locking said lasting-straps around the lasts operated upon, and suitable mechanism for operating said toggles, all substantially as shown and described, for the purpose set forth.

7. In a lasting-machine of the class described, whose lasting-straps or their operating connections are permanently positioned over the upper to be lasted, swinging arms located on each side of the machine, with lasting-straps secured to their upper ends, and swinging arms pivoted thereto and provided with suitable connecting mechanism to fixed parts of the machine to insure their swinging reversely to the arms, to which they are pivoted when said arms are operated in either direction, all constructed substantially as described, and for the purpose set forth.

8. In a lasting-machine of the class described, whose lasting-straps or their operating connections are permanently positioned over the upper to be lasted, swinging arms located on each side of the machine, with lasting-straps secured to their upper ends, and swinging arms pivoted thereto and provided with suitable connecting mechanism to fixed parts of the machine to insure their swinging reversely to the arms, to which they are pivoted when said arms are operated in either direction and provided with the joints $E^9$ and $b^{10}$, all operating substantially as shown and described.

9. In a lasting-machine, in combination with the jack-post provided with the spring $G^2$ and the stop-pin $G'$, the sliding plates $F^4$ and $F^7$, the counterweighted pawls $G^9$, the ratchet-wheel $G^7$, the lever $A^8$, and suitable connecting mechanism, all operating substantially as shown and described.

10. In a lasting-machine, the swinging frame K, carrying the heel-lasting mechanism and mounted upon the lever $K^4$, in combination with the spring $K^7$, the foot treadle or lever $K^{14}$, and suitable connecting mechanism whereby the action of spring and treadle causes the heel-lasting mechanism to reciprocate vertically at will of the operator, substantially as shown and described.

11. In a lasting-machine in which the heel-lasting mechanism is swung from the toe-lasting mechanism for the purpose of introducing the last, the combination of said swinging frame and the balance and drawing spring $K^{10}$, substantially as described.

12. In a lasting-machine of the class described, the combination of the treadle $E^7$, provided with extension $E^8$, and the lever $A^5$, mounted upon the releasing-shaft $A'$ and provided with the pin $A^{11}$, all operating substantially as shown and described.

13. In a lasting-machine of the class described, the combination of the doubled holding-straps $a$, the connections $a^2$, connecting the looped ends of said straps to the swinging arms $E^3$, and the springs $a^3$, connecting the free ends of said straps to the projection $a^5$ by the interposed rings $a^4$, all substantially as described.

14. In a lasting-machine of the class described, the double-ended swinging latch $K^{11}$, hung upon the swinging frame K, the beveled catches $E^{10}$, fixed at the ends of the horizontal ties E, and suitable connecting and operating mechanism, substantially as described, all operating as set forth.

15. In a lasting-machine of the class described, jacking mechanism consisting of the crank $e^3$, properly mounted upon the swinging frame K and connected to the swinging arm F by the chain $e^5$, the hand-wheel $e^8$, provided with automatic holding mechanism and the torsional spring $e^7$, and suitable connecting and operating mechanism, all substantially as described, and for the purpose set forth.

16. In a lasting-machine, in combination with mechanism for operating and holding heel and toe bands thereof, the spring connections $h^3$, the lever $h^2$, the bell-crank lever $k$, connecting-rod $k^2$, treadle $k^3$, and spring $k^4$, all substantially as shown and described.

17. In a lasting-machine, in combination with the heel and toe bands thereof, means for giving said bands automatic angular adjustment to counters and toes of varying curves and angles, consisting of the ear $g^{13}$, attached to said bands and pivoted to the central support $g^4$ at $g^{14}$, and suitable connecting mechanism, substantially as described.

18. In a lasting-machine, in combination with the lasting-plates thereof, the cross-bar $H^4$ and suitable operating mechanism, substantially as shown and described.

GEO. W. COPELAND.
    JOS. E. CRISP.
    EDWARD F. GRANDY.

Witnesses:
 H. N. WHITNEY,
 H. M. CHOATE.